(12) United States Patent
Garden

(10) Patent No.: US 10,962,155 B2
(45) Date of Patent: Mar. 30, 2021

(54) PIPELINE APPARATUS COMPRISING A REDUCING BUSH

(71) Applicant: Rigdeluge Global Limited, Aberdeenshire (GB)

(72) Inventor: Ian Garden, Aberdeenshire (GB)

(73) Assignee: Rigdeluge Global Limited, Aberdeenshire (GB)

( * ) Notice: Subject to any disclaimer, the term of this patent is extended or adjusted under 35 U.S.C. 154(b) by 70 days.

(21) Appl. No.: 15/766,419

(22) PCT Filed: Oct. 7, 2016

(86) PCT No.: PCT/GB2016/053129
§ 371 (c)(1),
(2) Date: Apr. 6, 2018

(87) PCT Pub. No.: WO2017/060724
PCT Pub. Date: Apr. 13, 2017

(65) Prior Publication Data
US 2018/0283587 A1    Oct. 4, 2018

(30) Foreign Application Priority Data

Oct. 7, 2015  (GB) ..................................... 1517761

(51) Int. Cl.
*F16L 25/14*        (2006.01)
*A62C 35/68*        (2006.01)
(Continued)

(52) U.S. Cl.
CPC .............. *F16L 25/14* (2013.01); *A62C 31/02* (2013.01); *A62C 35/68* (2013.01); *B05B 15/658* (2018.02); *B05B 15/40* (2018.02)

(58) Field of Classification Search
CPC ......... A62C 31/02; A62C 35/68; F16L 25/14; B05B 1/14; B05B 15/40; B05B 15/658
(Continued)

(56) References Cited

U.S. PATENT DOCUMENTS 2,172,532 A     9/1939  Fentress
2,456,418 A  * 12/1948  Imerman ................. F16L 15/08
                                                      285/148.23
(Continued)

FOREIGN PATENT DOCUMENTS

FR         2229211 A5    12/1974

OTHER PUBLICATIONS

International Search Report for Application No. PCT/GB2016/053129 dated Dec. 16, 2016, 3 pages.
(Continued)

*Primary Examiner* — Darren W Gorman
(74) *Attorney, Agent, or Firm* — Howard & Howard Attorneys PLLC

(57) ABSTRACT

A pipeline apparatus comprising a reducing bush apparatus having a reducing bush, and a pipe fitting comprising a threaded socket. The reducing bush has an outer surface which comprises a threaded portion connected to the threaded socket of the pipe fitting. The reducing bush comprises a bore extending from a first end to a second end, the bore having an inner surface. The inner surface comprises a first threaded portion at its first end on an inside of the pipe fitting, and a second threaded portion at its second end on an outside of the pipe fitting. The outer surface has a larger diameter than the second end of the inner surface. Embodiments further include both a filter and nozzle threadably engaged, on opposite sides of the reducing bush.

11 Claims, 15 Drawing Sheets

(51) Int. Cl.
  *B05B 15/658*  (2018.01)
  *A62C 31/02*  (2006.01)
  *B05B 15/40*  (2018.01)

(58) Field of Classification Search
  USPC .................... 169/37; 239/462, 590, 590.3
  See application file for complete search history.

(56) References Cited

U.S. PATENT DOCUMENTS

| | | |
|---|---|---|
| 2,546,348 A | 3/1951 | Schuman |
| 2,779,478 A * | 1/1957 | Wahlin ................ B21B 45/08 |
| | | 210/232 |
| 3,268,176 A | 8/1966 | O'Brien et al. |
| 5,109,929 A * | 5/1992 | Spears ................ F16L 47/24 |
| | | 169/16 |
| 5,291,969 A | 3/1994 | Diederich, Jr. |
| 5,472,025 A | 12/1995 | Conrad et al. |
| 5,632,129 A | 5/1997 | Imai et al. |
| 6,530,608 B1 | 3/2003 | Coronado |
| 2002/0096580 A1 | 7/2002 | Pahila |

OTHER PUBLICATIONS

English language abstract and machine-assisted English translation for FR 2 229 211 extracted from espacenet.com database on Jul. 1, 2020, 4 pages.

\* cited by examiner

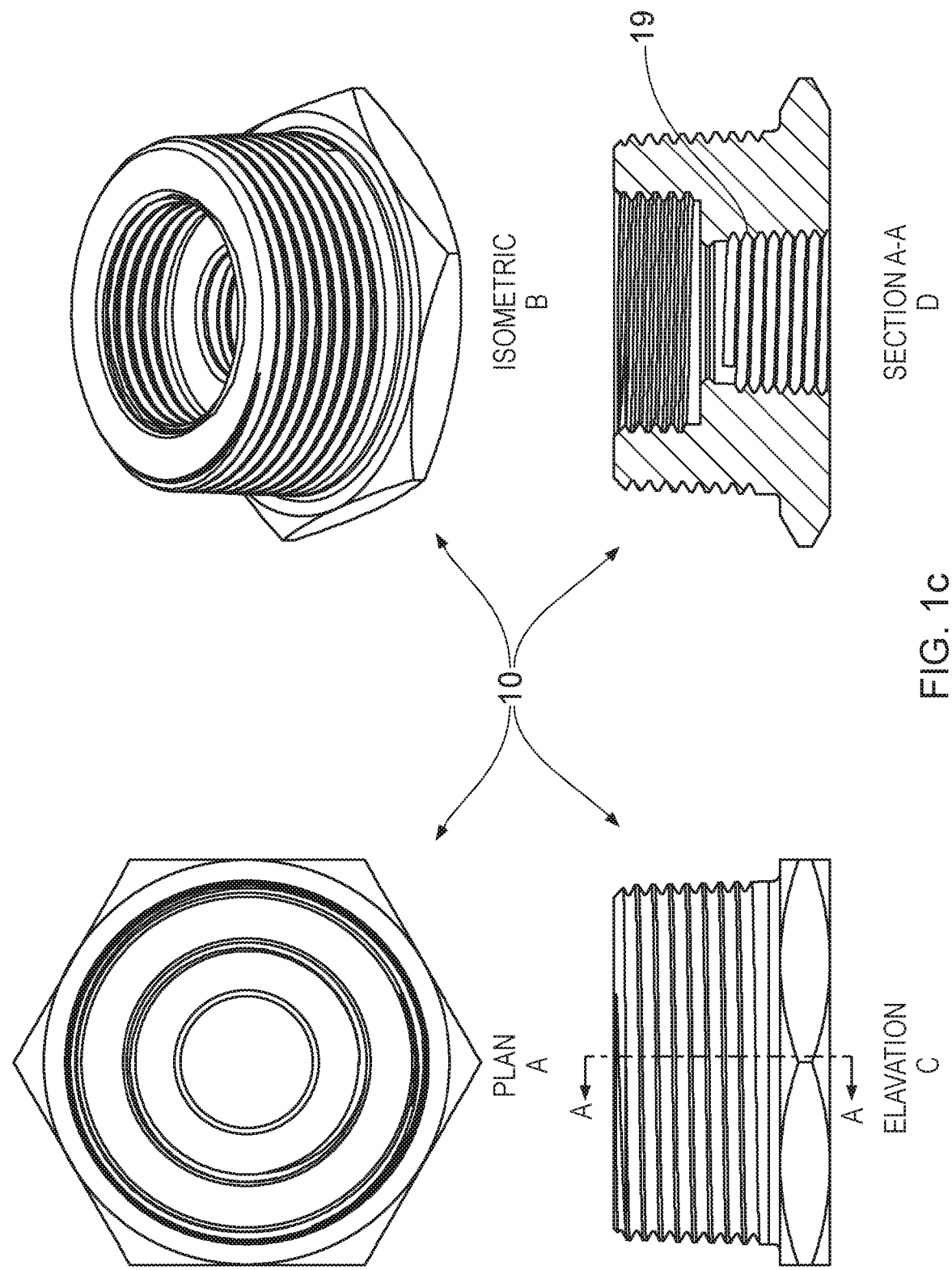

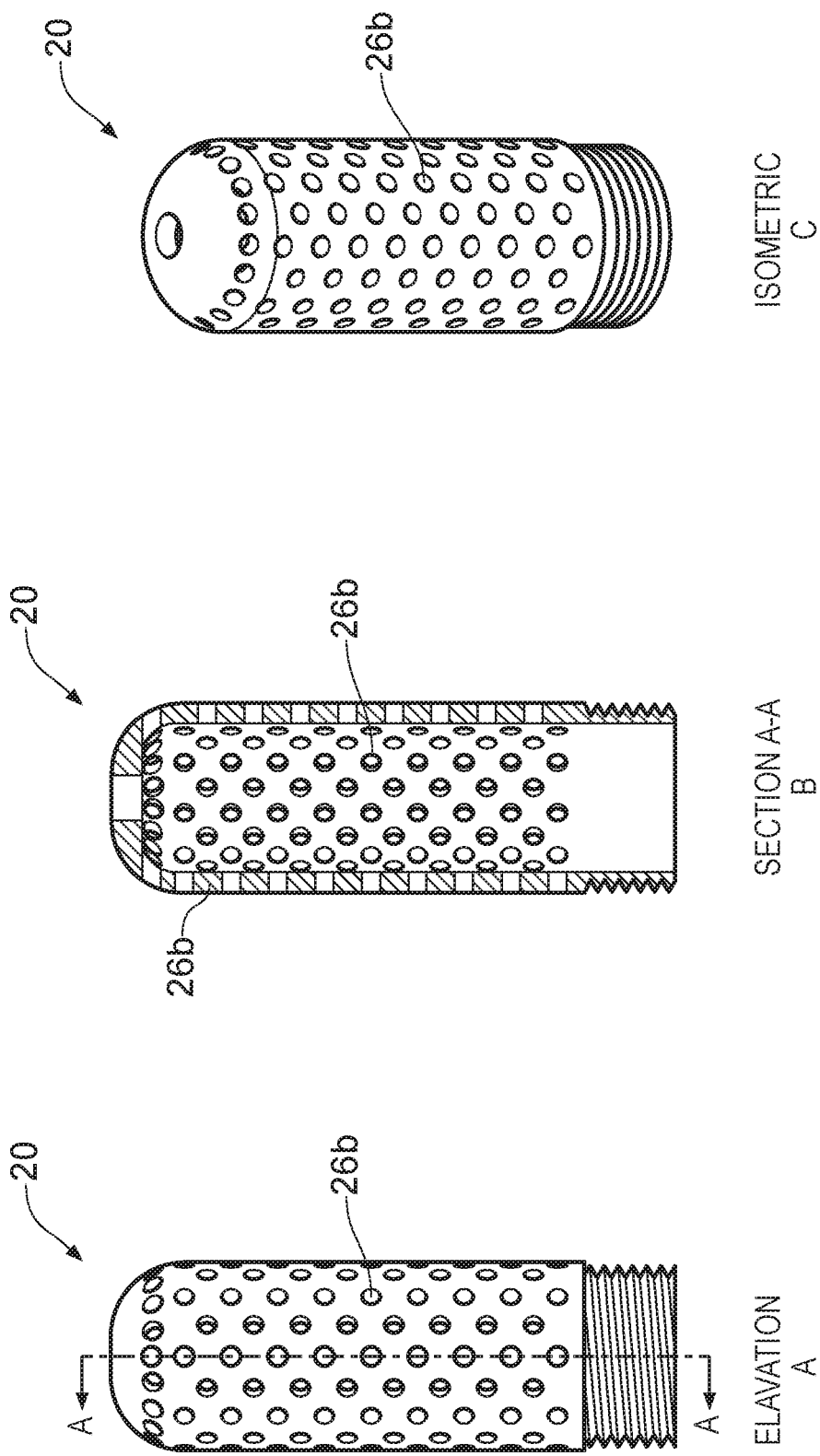

PIPELINE APPARATUS COMPRISING A REDUCING BUSH

CROSS-REFERENCE TO RELATED APPLICATIONS

The present application is the National Stage of International Patent Application No. PCT/GB2016/053129, filed on Oct. 7, 2016, which claims priority to and all the benefits of Application No. 1517761.1, filed on Oct. 7, 2015 in the United Kingdom, which are hereby expressly incorporated herein by reference in their entirety.

The present invention relates to a pipeline apparatus comprising a reducing bush apparatus and reducing bush which in use can connect a nozzle apparatus to a pipeline. The nozzle apparatus is particularly, but not exclusively, for use in firefighting or fire suppression.

Fluid flow systems, such as sprinkler systems are widely used in onshore and offshore installations, such as oil and gas platforms, to contain or suppress fire. During operation of the sprinkler system, it is likely that scale, debris and other pollutants will build up and become a problem. Scale is typically formed by the precipitation of mineral compounds from water, such as calcium carbonate or calcium sulphate, due to pressure and/or temperature changes in the pipeline. Corrosion in pipelines can build up along the inner wall of pipe and also results in debris entering the system. Marine growth can also cause blockage problems. Salts can also crystallise and cause blockage problems. The by-products of salt water as a delivery fluid are also a problem and it is thought that this has contributed to firefighting/deluge systems offshore failing where there has been loss of life, asset and indeed oil spills.

Certain attachments, such as nozzles, may be attached to a socket, for example on a pipeline, by way of an outer thread on the attachments and an internal thread on the socket. In certain situations the diameter of the outer thread of the attachment is smaller than the diameter of the internal thread of the socket and a reducing bush is used therebetween in order to attach the attachment to the socket. Thus, as the skilled person will be aware, a reducing bush is a device which has larger outer diameter, a bore, and a narrower internal diameter in the bore. In this way, a reducing bush effectively reduces the size of a threaded socket in the pipeline, and provides a smaller diameter threaded connection in its inner bore for the attachment, such as a nozzle.

The inventor of the present invention has developed an improved reducing bush which may be used in such systems or associated pipework.

In accordance with a first aspect of the present invention there is provided a pipeline apparatus comprising a reducing bush apparatus having a reducing bush and a pipe fitting comprising a threaded socket, the reducing bush having:
an outer surface, the outer surface comprising a threaded portion connected to the threaded socket of the pipe fitting;
a bore extending from a first end to a second end;
the bore having an inner surface;
wherein the inner surface comprises a first threaded portion at its first end typically on an inside of the pipe fitting, and a second threaded portion at its second end typically on an outside of the pipe fitting.

At least a portion of the first threaded portion is typically opposite at least a portion of the threaded portion on the outer surface of the reducing bush. The diameter of said portion on the outer surface of the reducing bush is typically greater than the diameter of said portion on the first threaded portion.

The first threaded portion has a first diameter and the second threaded portion has a second diameter—the first and the second diameters may be the same size, but preferably are different sizes. For example, the first diameter may be wider than the second diameter.

A first attachment can be threadably attached to the first threaded portion of the inner surface, and on an opposite side of the reducing bush, a second attachment can be threadably attached to the second threaded portion of the inner surface.

The attachments may comprise a filter and/or a nozzle. Thus, a filter may be threadably engaged in the reducing bush via one of the inner threaded portions. And a nozzle may be threadably engaged in the reducing bush via one of the inner threaded portions.

Thus one or both of a nozzle and filter may be threadably attached to the reducing bush, the filter being on the inside of the pipe fitting and the nozzle on the outside of the pipe fitting. Preferably therefore the first, optionally wider diameter inner threaded portion is provided on the inside of the pipe fitting, and the second, optionally smaller diameter, threaded inner portion is provided on an outside of the pipe fitting.

Thus embodiments of the invention with a filter attached to the first threaded portion, can be stronger, because the outer diameter of the filter is not limited by the inner diameter of the reducing bush (as with known filters which can extend through the reducing bush). Wider filters, or filters with a greater wall thickness can therefore be used.

According to a further aspect of the invention there is provided a reducing bush apparatus comprising a reducing bush having:
an outer surface, the outer surface comprising a threaded portion;
a bore extending from a first end to a second end;
the bore having an inner surface;
wherein the inner surface comprises a first threaded portion at its first end, and a second threaded portion at its second end, the first threaded portion having a larger diameter than the second threaded portion;
and at least one of:
  i. an attachment comprising a filter threadably engaged in the first threaded portion on the inner surface; and
  ii. an attachment comprising a nozzle, the attachment threadably engaged in the second threaded portion on the inner surface.

The threaded portion of the outer surface of the reducing bush is normally connected to the threaded socket of the pipe fitting. Thus, the reducing bush may be used to mount the filter or nozzle to the pipe fitting.

The optional features of any aspect of the present invention can be incorporated into any other aspect of the present invention and vice versa.

Embodiments therefore include both a filter and nozzle threadably engaged, on opposite sides of the reducing bush, and such an embodiment of a reducing bush apparatus may be referred to as a 'nozzle apparatus'.

The filter and the nozzle are separate and distinct from each other, that is they are provided as separate pieces. This is in direct contrast with known nozzle apparatuses, where the filter and the nozzle are continuous (i.e. directly connected). It is an advantage of certain embodiments of the present invention that having the filter and the nozzle separate and distinct from each other helps to reduce the weight of the apparatus, thus making the nozzle easier and cheaper to manufacture. The filter can also provide an additional filter to a nozzle which has a filter included.

For example, known nozzles which have a less effective filter, or no filter at all, can be attached to a pipeline using the reducing bush described herein and an attached filter.

In one embodiment, a further nozzle apparatus having a nozzle and a further filter may be secured to the reducing bush apparatus as follows. The further nozzle apparatus comprises a built-in filter (the 'further filter'), attached to a nozzle. The nozzle apparatus has an outer thread. The filter part of the further nozzle apparatus is inserted through the reducing bush and the further nozzle apparatus secured to one end of the reducing bush via an inner thread on the reducing bush and the complementary thread on the nozzle. The filter described more generally herein may then be placed over the further filter of the further nozzle apparatus and threaded into the opposite end of the reducing bush. In this way, two filters are provided for the nozzle. To facilitate this, the diameter of the reducing bush thread on the inside of the pipeline is larger than that on the outside of the pipeline.

Preferably the first threaded portion and the second threaded portion are discontinuous, that is they are disconnected.

The threaded portion of the outer surface of the reducing bush may be considered a mounting means for mounting the reducing bush to the threaded socket of the pipe fitting in use.

The nozzle may form part of a nozzle apparatus, the nozzle apparatus comprising a further filter attached to the nozzle, the further filter extending into, optionally through, the bore of the reducing bush.

Various types of thread may be used.

The thread on the inside of the pipeline may be a parallel thread, and the thread on the outside of the pipeline may be an NPT thread.

The pipe fitting may be any shape and size. The pipe fitting may be one of a T-Fitting, an elbow fitting, an angle fitting or a straight pipe. The pipe fitting may have an inner diameter of at least 0.5" (~1.27 cm), optionally more than 0.75" (~1.9 cm), more optionally more than 1" (~2.54 cm). In some embodiments, the pipe fitting may have an inner diameter of up to 3.5" (~8.9 cm), up to 3" (~7.62 cm), or up to 2" (~5.1 cm).

In use, the filter of the nozzle apparatus typically extends into the pipe fitting. The length of the filter and/or the length of the slots and/or holes may vary depending on the application of the nozzle apparatus, e.g. the inner diameter of the pipeline and/or the shape of the pipeline to which it may be mounted to in use.

When a straight fitting is used, the first end of the filter may extend into the pipeline by from 5 mm to 100 mm from the top edge of the threaded socket.

It can extend into the pipeline to an optimum distance which can complement a filter attached to a nozzle giving a dual filter.

The filter may comprise two sections: a first section with the further inlets, e.g. slots and/or holes, and a second section without further inlets.

In use, the filter and/or the nozzle is interchangeable with other filters and/or nozzles. The filter and/or the nozzle may be removed from the reducing bush and replaced with a different inlet and/or nozzle.

It is an advantage of embodiments of the present invention that having a separate filter and nozzle allows the filter and/or the nozzle to be interchangeable with other filters and/or nozzles. For example, the filter can be removed and replaced with a filter of a different length, or a filter which has a different arrangement of slots and/or holes, or which has slots with a different length. Nozzles can be replaced in a similar fashion.

It is also an advantage of embodiments of the present invention that the slots and/or holes can help to reduce the volume of debris, such as scale, rust particles, salt deposits and marine build-up, entering the nozzle apparatus through the filter. Not only can this help to reduce the likelihood of the nozzle becoming blocked, but this can also help to reduce the volume of debris being distributed out with the nozzle apparatus, and thus may help to reduce the likelihood of injury being caused to personnel.

The nozzle apparatus described herein may be suitable for a variety of applications which require clear flow of fluid. Preferably the nozzle apparatus is suitable for use in pipelines, as described in the second aspect of the present invention. For example, the nozzle apparatus may be suitable for use with a burner head for flaring oil or gas, water delivery lines, and especially a sprinkler system for firefighting or fire containment.

In accordance with a third aspect of the present invention there is provided a method of using the reducing bush optionally with a filter, optionally with a nozzle, as described herein for firefighting and/or fire containment.

The nozzle apparatus is typically mounted to a pipeline via the reducing bush, as described herein.

The firefighting and/or fire containment is often for open sprinkler systems, that is those exposed to the environment. Precipitation and moisture thus encourage rust and other deterioration of such an open system. Those in the marine environment, such as offshore sprinkler systems, are particularly prone to debris within pipework leading to blocked nozzles because of the salt water environment which can further deteriorate the pipework.

The nozzle apparatus as described herein helps to mitigate or reduce blockages in such pipework and thus is especially useful for marine environment such as offshore sprinklers.

The reducing bush of the present invention may be connectable with the filters and the nozzles of existing nozzles. Thus, a variety of different nozzles and, independently, a variety of filters may be used with the reducing bush. This may have the advantage that no new nozzles or filters need to be manufactured to allow the present invention to function. This means that operators may use their existing nozzles with the reducing bush of the first aspect, which in turn helps to keep costs down.

For certain embodiments, the filter may have a tube extending from a first end to a second end, an inlet at the first end, the tube having a filter bore with a first internal cross-sectional area and a plurality of further inlets in the filter between an outside thereof and the filter bore.

For certain embodiments, the nozzle extends from a first end to a second end, and has a nozzle bore with a second internal cross-sectional area. It also has an outlet from the nozzle, the outlet in communication with the nozzle bore, being positioned at the second end of the nozzle.

For certain embodiments, the first internal cross sectional area and/or diameter of the filter is the same or larger than the cross sectional area and or diameter respectively, of at least one of the bore of the reducing bush and a main bore of the nozzle.

Normally, the filter is connectable to the first threaded portion of the reducing bush, and the nozzle is connectable to the second threaded portion of the reducing bush.

The inlet to the filter may have a polygonal cross-sectional, such as a hexagonal shape. This can facilitate threading of the filter into the reducing bush by way of a suitable tool, such as an Allen key.

The filter normally comprises an outer surface with a threaded portion, typically adjacent to the second end, for mounting the filter to an inner threaded portion of the reducing bush. The nozzle normally comprises an outer surface comprising a threaded portion for mounting the nozzle to one of the inner threaded portions of the reducing bush in use.

In use, the filter and the nozzle are both mounted to the reducing bush. When assembled, the length of the nozzle apparatus may be from 0.25" (~0.64 cm) to 12" (~30.5 cm).

For certain embodiments, the inlet to the filter bore comprises an inlet cross-sectional area which may be at least 75%, preferably at least 90% and ideally 100%, of the first internal cross-sectional area. This assists in maintaining pressure and flow rate in the nozzle apparatus in use. Alternative embodiments can have smaller inlets.

The filter and/or the nozzle may be circular in cross-section. The filter bore and/or the nozzle bore may also be circular in cross-section. Preferably the filter bore and/or the nozzle bore extends longitudinally and has a central axis therein. The central axis of the filter bore and the central axis of the nozzle bore are preferably aligned with each other in use.

The filter bore and the nozzle bore each comprise a minor axis and a major axis. The first internal cross-sectional area and/or the second internal cross-sectional area has a minor axis to major axis ratio of at most 2:1, normally 1.5:1, 1.1:1 or equal i.e. 1:1. The first internal cross-sectional area and/or the second internal cross-sectional area is normally circular.

The number of further inlets depends on the diameter of the filter. There is normally at least 8 further inlets, and for a 0.5" (~1.27 cm) diameter filter, there are normally up to 20 further inlets. The further inlets may extend along a portion of the filter, for example up to 99%, 75% or up to 50% of the length of the filter. The further inlets may extend for more than 25% of the length of the tube or more than 33%.

The width of the outlet may be much larger than the minimum dimension of the further inlets. It may be 2, 2.5 or 3 fold larger.

The further inlets normally have a minimum dimension, which may be smaller than a minimum dimension of the outlet of the nozzle. Therefore any debris small enough to pass through the further inlets will also be too small to block the outlet because the further inlets are smaller than the outlet.

The further inlets may be slots. Each slot typically comprises a first dimension and a second dimension. The first dimension is normally the length of a slot, and the second dimension is normally the width of a slot. The length of the slot is typically greater than the width of the slot. The width of each slot may be 1 mm or greater, but the width is always 50% or less than the width of the nozzle bore. The length is normally at least 1.5 cm, optionally at least 2 cm, or normally (for larger pipes) more than 3 cm. The length of each slot may extend up to 10 cm or up to 8 cm. Alternatively, the slots may extend for more than 4 cm and optionally up to 6 cm.

Each slot may extend generally parallel (+/−10 degrees) to the (normally longitudinal) direction from the first to the second end.

In an alternative embodiment, the further inlets may be circular holes. Each circular hole typically comprise one dimension, that is the diameter. The diameter of each circular hole may be 1 mm or greater, but is typically not more than 50% of the width of the nozzle bore.

The cross-sectional area of a single slot or a single hole is typically less than the second internal cross-sectional area, that is the cross-sectional area of the nozzle bore.

In general, the each slot or hole normally has a width or diameter of from 1 mm to 3 mm, or optionally form 1.5 mm to 2.5 mm. The spacing between each slot or hole is normally between 50% and 150% larger than the width of a single slot or hole respectively. For example each slot or hole may have a width or diameter of 1 mm, and be spaced apart by 2 mm.

Embodiments of the invention will now be described by way of example only and with reference to the accompanying drawings, in which:

FIG. 1c shows four views of the reducing bush;

FIG. 5a shows three views of the FIG. 1e filter;

Figure 1A:
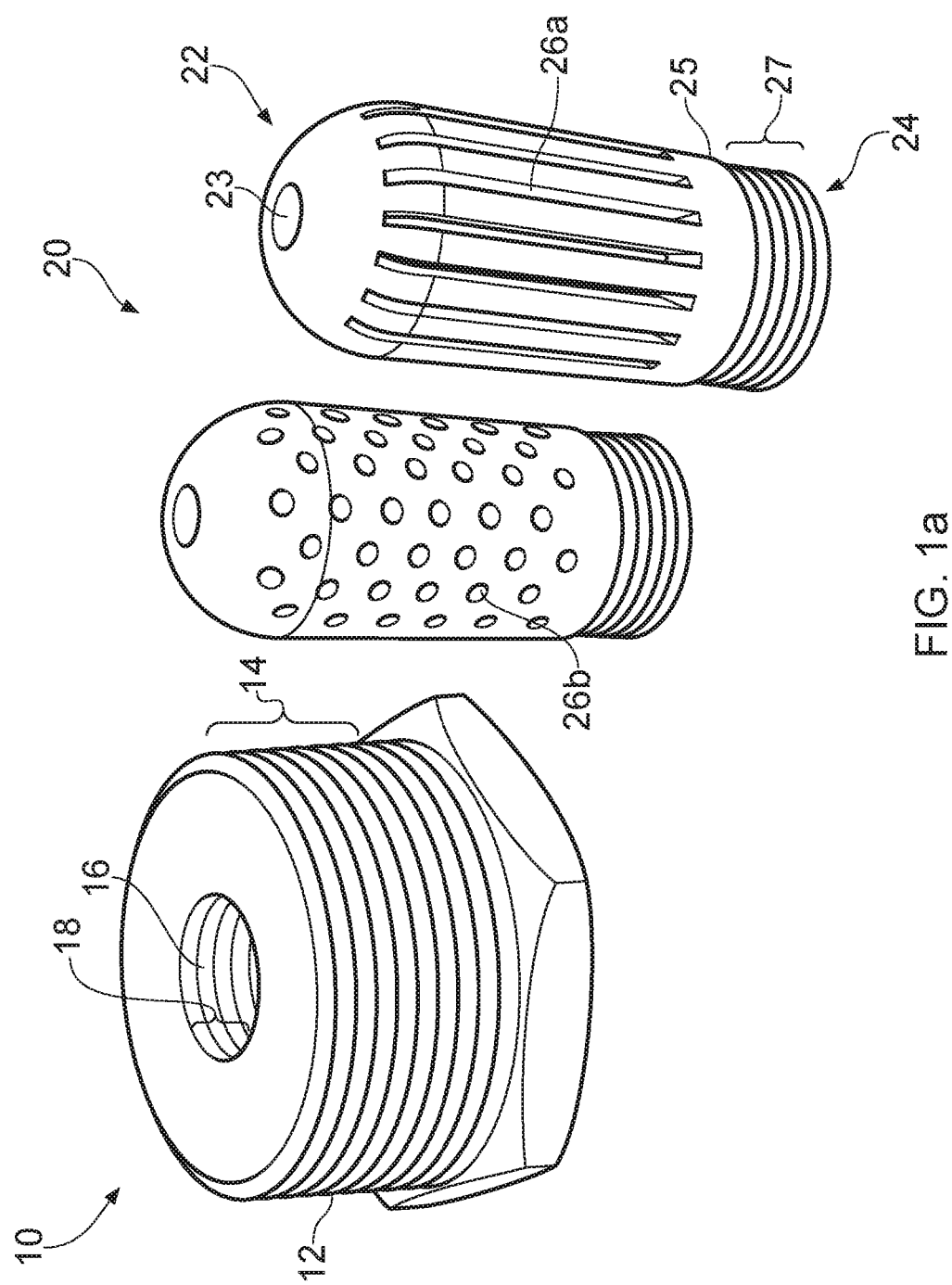
FIG. 1a is a perspective view of a reducing bush and two different embodiments of a filter.

FIG. 1a shows a reducing bush 10 comprising an outer surface 12 with a threaded portion 14; and an inner surface 16 with an upper threaded portion 18 and a lower threaded portion (not shown in FIG. 1a).

The upper threaded portion 18 and the lower threaded portion are discontinuous, that is they are not connected. The upper threaded portion 18 has a first diameter and the lower threaded portion has a second diameter. The first diameter and the second diameter are different sizes, such that the first diameter is larger than the second diameter.

FIG. 1a also shows two embodiments of the filter 20. Both filters 20 comprise a first end 22, a second end 24 and an inlet bore (not shown). The filter and the inlet bore are circular in cross-section. The first end 22 comprises an inlet 23. The inlet 23 has a circular cross-sectional area which is smaller than the cross-sectional area of the inlet bore. For certain embodiments, the inlet has a hexagonal shape, which facilitates the attachment of the filter to the reducing bush.

The filter 20 also comprises an outer surface 25, which comprises a threaded portion 27 adjacent to the second end

24. Each filter 20 comprises a plurality of further inlets 26a or 26b. Further inlets 26a are slots, whereas further inlets 26b are circular holes. In an alternative embodiment, the further inlets may be a combination of slots and holes.

In use, the filter 20 is mounted to the reducing bush 10 by inserting the threaded portion 27 of the filter 20 into the upper threaded portion 18 of the reducing bush 10, and rotating the two components with respect to each other such that their threads engage.

Figure 1B:
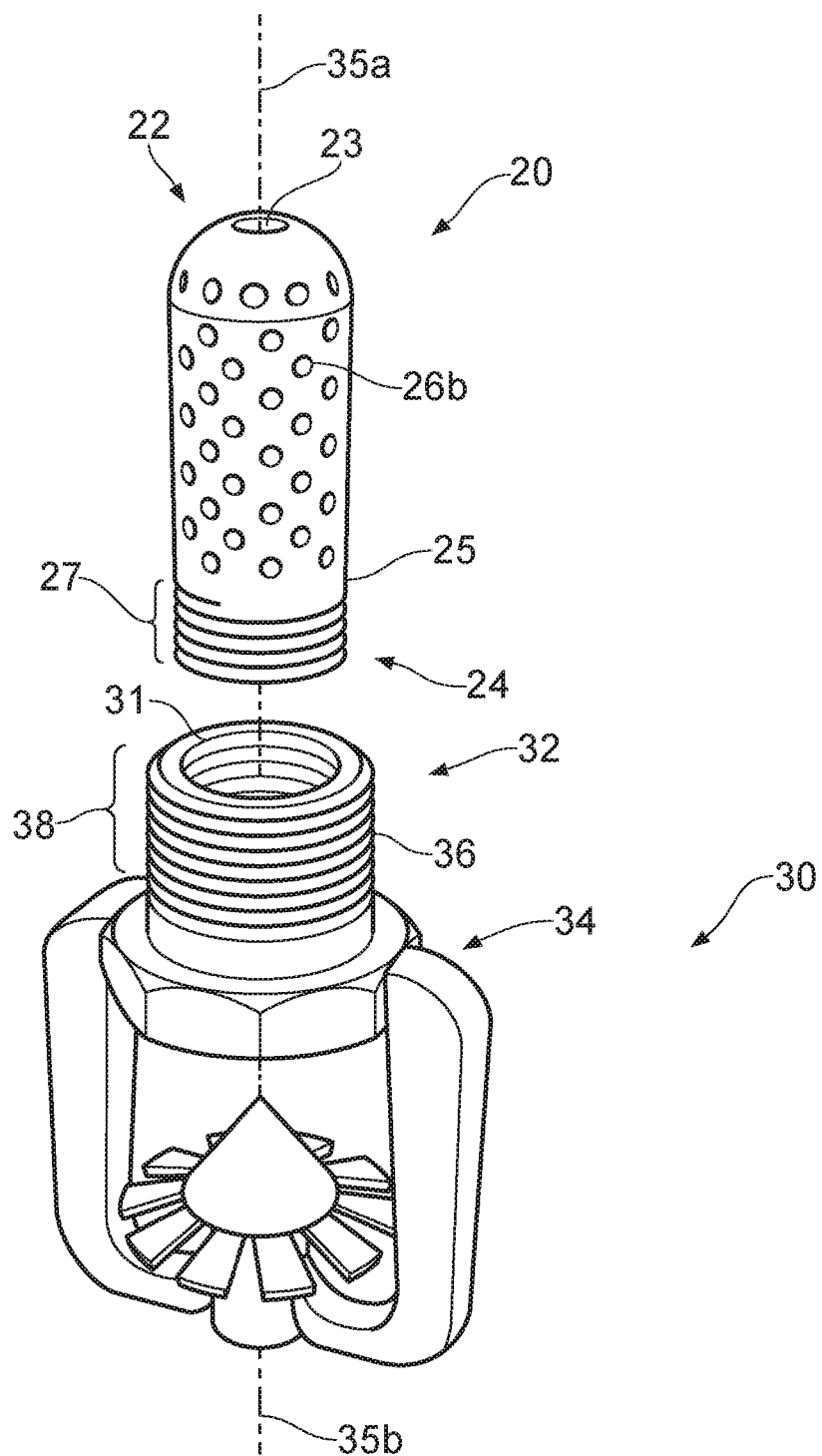
FIG. 1b is a perspective view of embodiments of the filter and the nozzle.

FIG. 1b shows the filter 20 with circular holes 26b, and a nozzle 30. The nozzle 30 comprises a first end 32, a second end 34 and a nozzle bore 31. The second end 34 of the nozzle 30 comprises an outlet (not shown in FIG. 1b). The inlet bore and the nozzle bore 31 have a circular cross-section.

FIG. 1b clearly shows that the filter 20 and the nozzle 30 are separate components, that is they are not directly connected to each other. In use, the filter 20 and the nozzle 30 are indirectly connected via the reducing bush 10.

Each hole 26b has a cross-sectional area which is smaller than the cross-sectional area of the bore 31. In embodiments using filter 20 with slots 26a, the width of the slots 26a is less than the width (or diameter) of the bore 31.

The nozzle 30 comprises an outer surface 36, which comprises a threaded portion 38. In use, the nozzle 30 is mounted to the reducing bush 10 by inserting the threaded portion 38 of the nozzle 30 into the lower threaded portion of the reducing bush 10, and rotating the two components with respect to each other such that their threads engage.

A central axis 35a extends through the inlet bore and a central axis 35b extends through the bore 31. Both the inlet bore and the bore 31 extend longitudinally along their respective central axis 35a, 35b. Central axes 35a & 35b are aligned with each other in use.

Figure 1D:
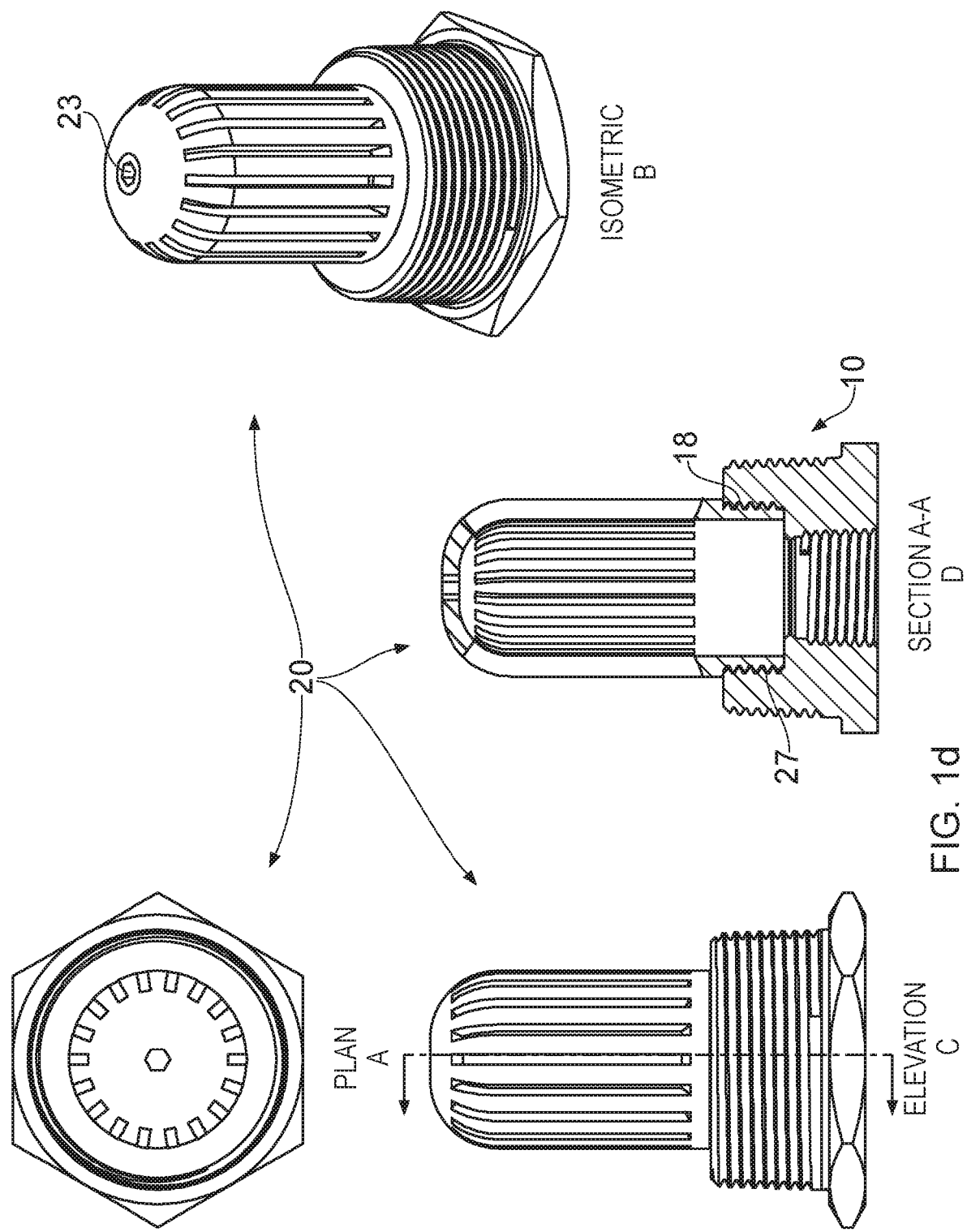
FIG. 1d shows four views of an embodiment of the filter engaged with the reducing bush.

FIGS. 1c and 1d show a front view A, a perspective view B, an end view C and a sectional view D of the reducing bush 10, and an embodiment of the filter 20 respectively. The features depicted are similar to those shown in FIG. 1a. In FIG. 1c, the lower threaded portion 19 of the reducing bush is now visible. In FIG. 1d, the inlet 23 of the filter 20 is shown to have a hexagonal shape, and it is also shown that the reducing bush 10 and the filter 20 may be threadably engaged. The upper threaded portion 18 of the reducing bush engages with the threaded portion 27 of the filter.

Figure 1E:
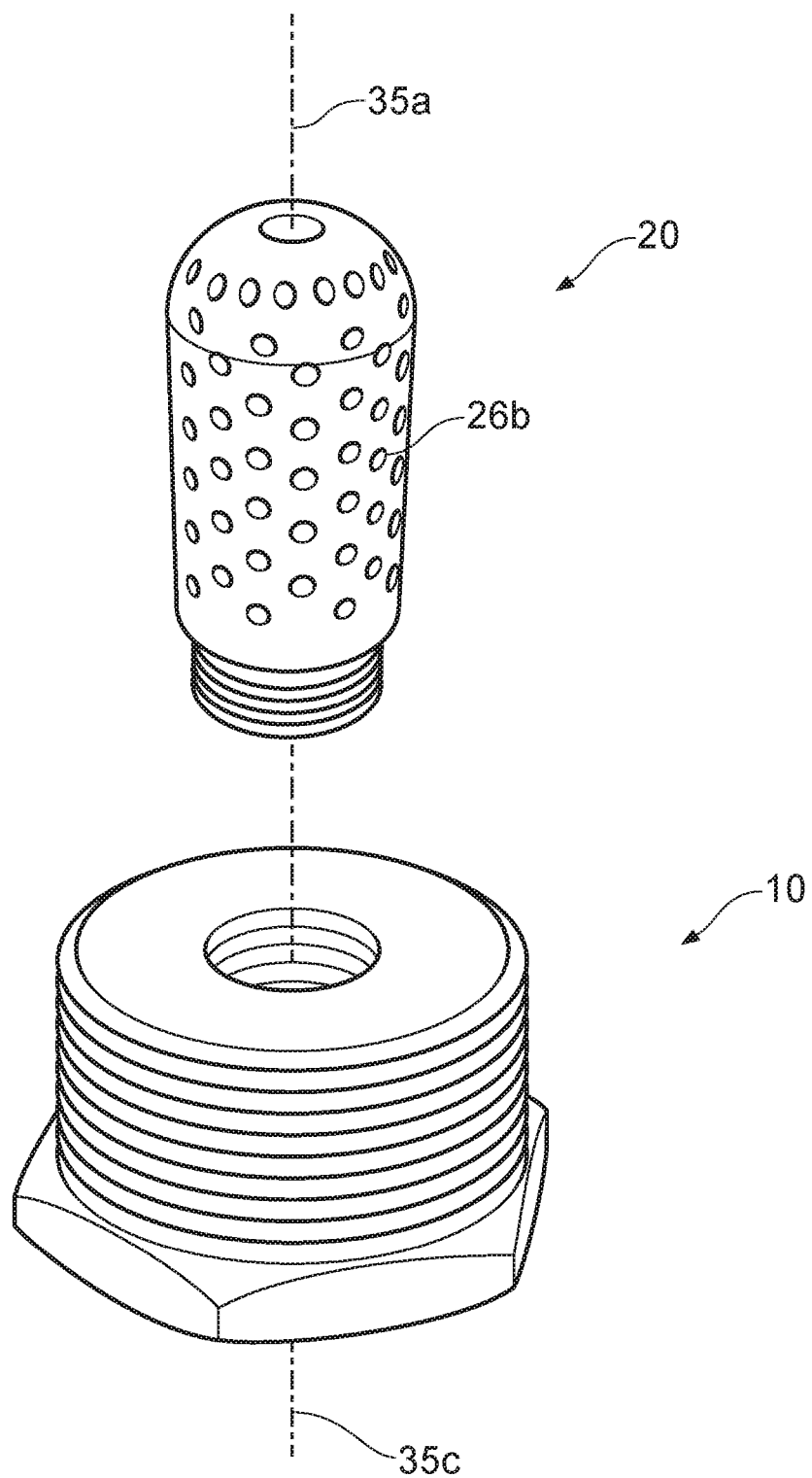
FIG. 1e is a perspective view of the filter and reducing bush in accordance with one embodiment of the present invention.
Figure 1F:
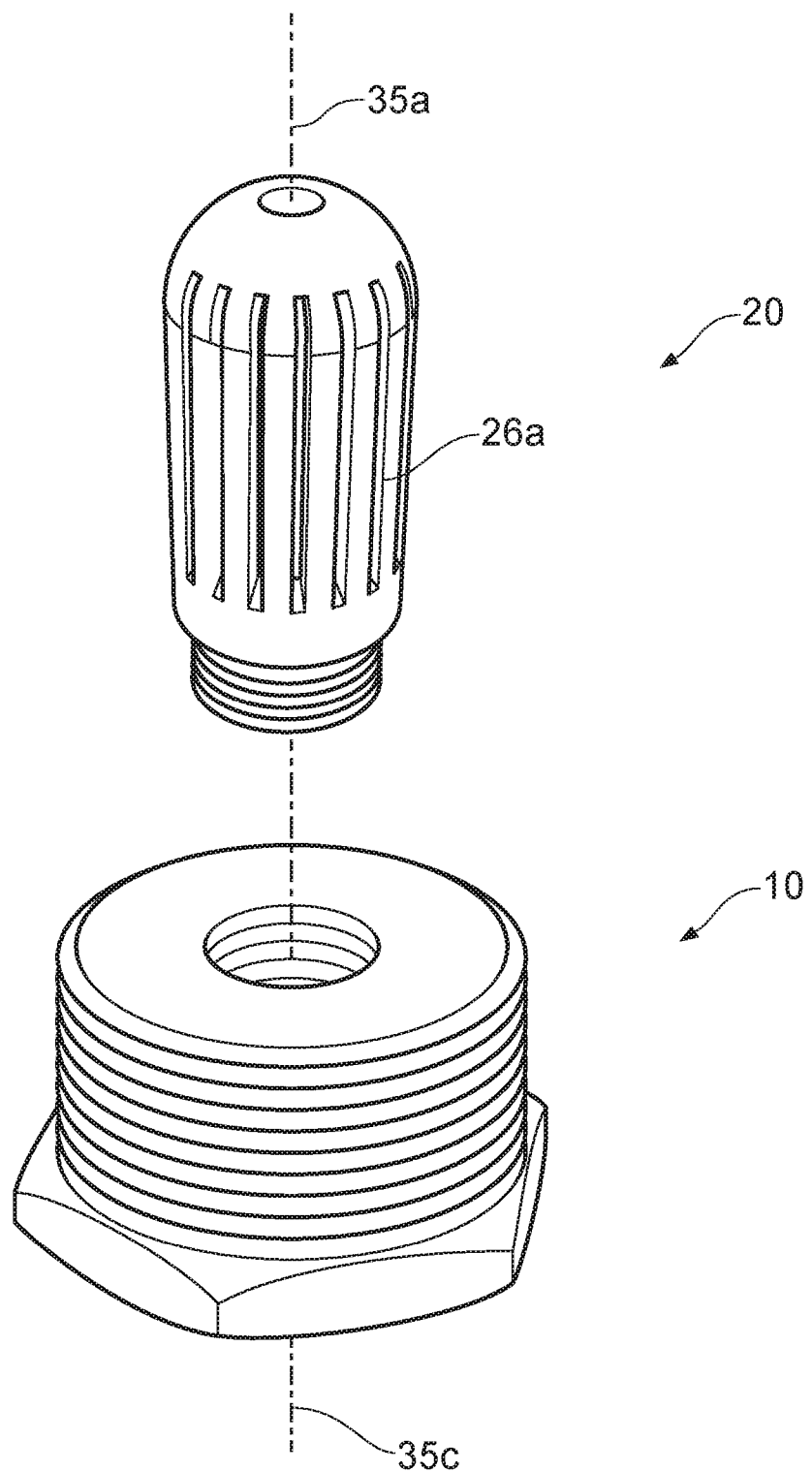
FIG. 1f is a perspective view of the filter and reducing bush in accordance with another embodiment of the present invention.

FIGS. 1e and 1f show embodiments of the filter 20 with circular holes 26b and slots 26a respectively. A central axis 35c extends through the reducing bush 10. In both embodiments shown, central axes 35a & 35c are aligned with each other in use.

Figure 2:
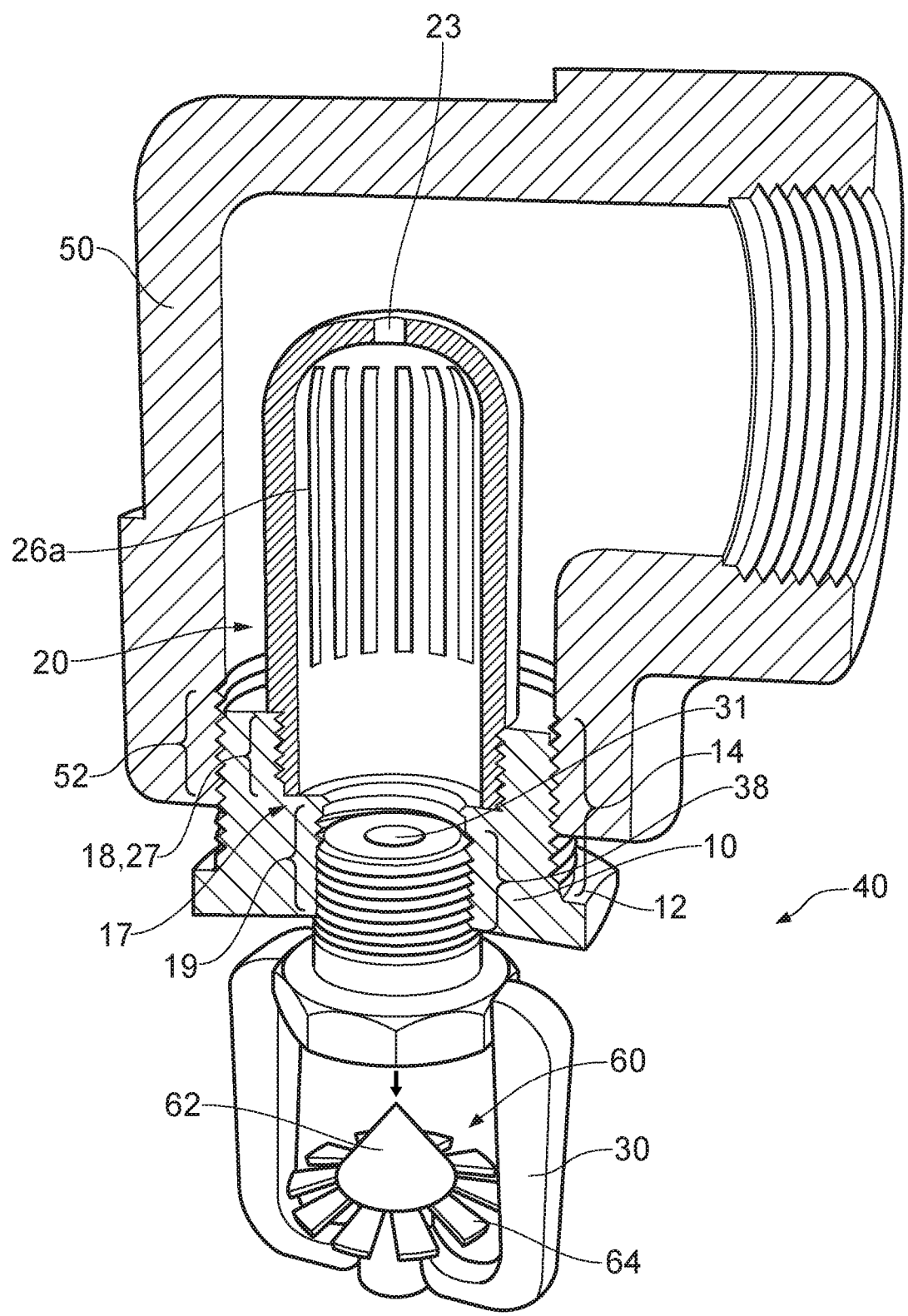
FIG. 2 is a part cut-away perspective view of the nozzle apparatus mounted to an elbow fitting in accordance with one embodiment of the present invention.

FIG. 2 shows a nozzle apparatus 40 comprising the reducing bush 10, filter 20 and nozzle 30. The filter 20 and the nozzle 30 are both mounted to the reducing bush 10.

The nozzle 30 comprises an outlet (not shown). The nozzle apparatus 40 is mounted to an elbow fitting 50 which comprises a threaded socket 52.

It can clearly be seen that the lower threaded portion 19 of the reducing bush 10 is distinct from the upper threaded portion 18 by the presence of a non-threaded portion 17 between the upper threaded portion 18 and lower threaded portion 19.

The filter comprises a plurality of parallel slots 26a. Each slot has a width which is less than 50% the width of the bore 31. Furthermore, the cross-sectional area of each slot 26a is less than the cross-sectional area of the bore 31.

The filter 20 extends beyond the reducing bush 10 and into the elbow fitting 50. A first section of the filter 20 comprising the slots 26a lies out with the reducing bush 10.

FIG. 2 also shows that the diameter of the lower threaded portion 19 is smaller than the diameter of the upper threaded portion 18; and the diameter of the threaded portion 27 of the filter 20 is greater than the diameter of the threaded portion 38 of the nozzle 30.

In use, the filter 20 is mounted to the reducing bush 10 by inserting the threaded portion 27 of the filter 20 into the upper threaded portion 18 of the reducing bush 10, and rotating the two components with respect to each other such that their threads engage; and the nozzle 30 is mounted to the reducing bush 10 by inserting the threaded portion 38 of the nozzle 30 into the lower threaded portion 19 of the reducing bush 10, and rotating the two components with respect to each other such that their threads engage. The reducing bush 10, along with the attached filter 20 and nozzle 30, are mounted to the threaded socket 52 of the elbow fitting 50 by inserting the threaded portion 14 on the outer surface 12 of the reducing bush 10 into the threaded socket 52, and rotating the two components with respect to each other such that their threads engage. The threaded portion 14 on the outer surface of the reducing bush 10 and the smaller diameter lower threaded portion 19 effectively allows the reducing bush 10 to function by reducing the effective socket size required of the elbow (or any other type) of fitting 50 for the nozzle 30.

Once the nozzle apparatus 40 is assembled, fluid flows through the elbow fitting 50. The fluid enters the filter 20 through the inlet 23 and the slots 26a. The fluid then passes down through the filter 20, through the reducing bush 10 and then through the nozzle 30. The fluid is then ejected through the outlet (not shown) of the nozzle 30 in the direction of the arrow shown onto a diffuser 60. The diffuser 60 can be a variety of different shapes and sizes and in this embodiment includes a splitter 62 in the form of an inverted cone, and diffuser tines 64.

The fluid may comprise debris, such as scale and/or rust particles, of a variety of sizes. In use, the slots 26a help to prevent debris above a certain size from entering the filter 20 and being ejected through the outlet (not shown). For example, if the slots 26a have a width of 1 mm, then debris smaller than 1 mm can pass through the slots 26a and be ejected from the outlet 33; however any debris larger than 1 mm will be blocked from entering the filter 20.

Figure 3:
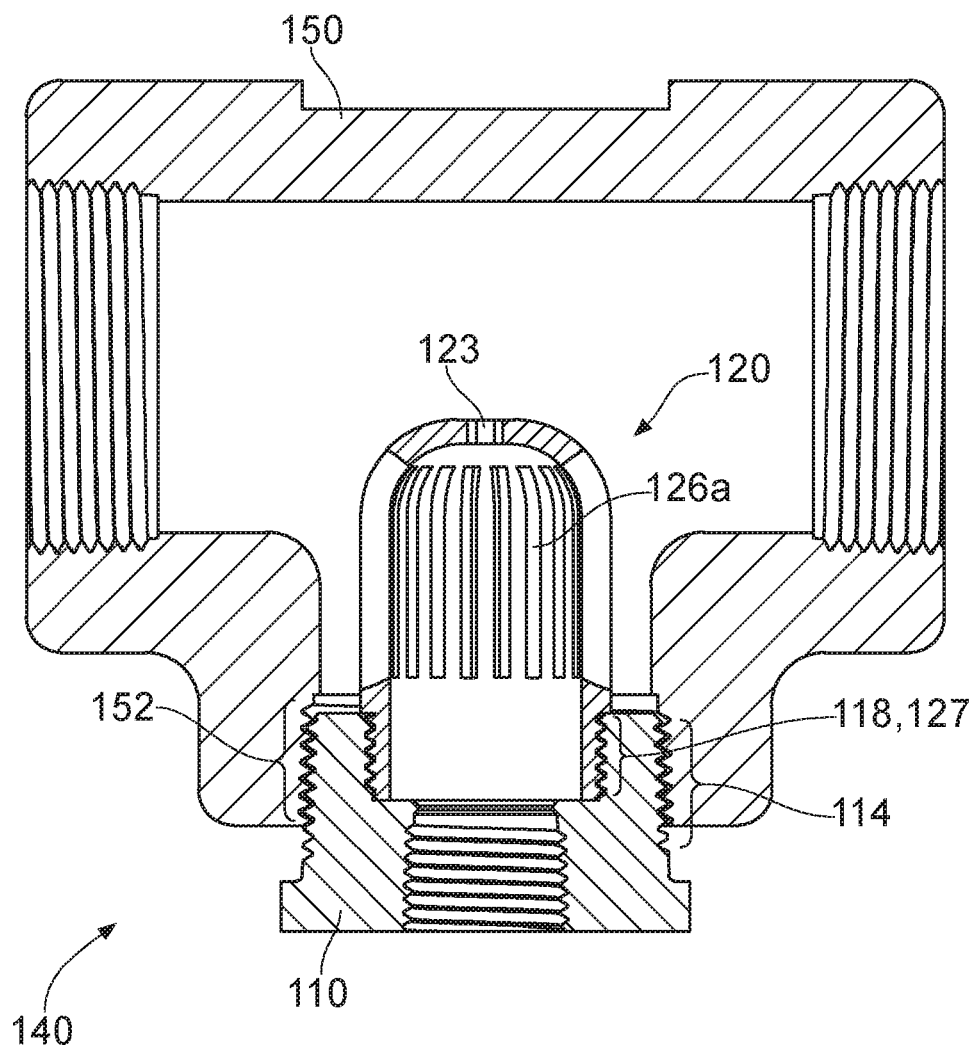
FIG. 3 is a sectional view of the reducing bush and filter, mounted to a T-fitting in accordance with another embodiment of the present invention.

FIG. 3 shows a further embodiment which includes like parts with the FIG. 2 embodiment and these are not described again in detail. The reference numerals of the like parts share the same latter two digits in both embodiments, but differ in that they are prefixed with a '1' in this second embodiment.

The FIG. 3 embodiment shows a nozzle apparatus 140 comprising a filter 120. The nozzle apparatus 140 is mounted, in the same way as described previously, except that the fitting is now a T-fitting 150 comprising a threaded socket 152. The reducing bush 110 is the same as described in FIG. 2, and will not be described in detail again here.

In use, the nozzle apparatus 40 in FIG. 2 can be disconnected from the elbow fitting 50 by unscrewing the reducing bush 10 from the socket 52. Filter 20 can then be removed from the reducing bush 10 by unscrewing the two components, but the nozzle 30 remains attached to the reducing bush 10.

The new filter 120 can then be mounted to the reducing bush 110 by inserting the threaded portion 127 of the filter 120 into the upper threaded portion 118 of the reducing bush 110, and rotating the two components with respect to each other such that their threads engage. The nozzle apparatus 140 is now fully assembled. The nozzle apparatus 140 is then mounted to the T-fitting 150 by inserting the threaded portion 114 of the reducing bush 110 into the threaded socket 152, and rotating the two components with respect to each other such that their threads engage.

Once the nozzle apparatus 140 is assembled and attached to the pipeline 150, fluid flows through the T-fitting 150. The fluid enters the filter 120 through the inlet 123 and the slots 126a, and continues as described above.

Figure 4:
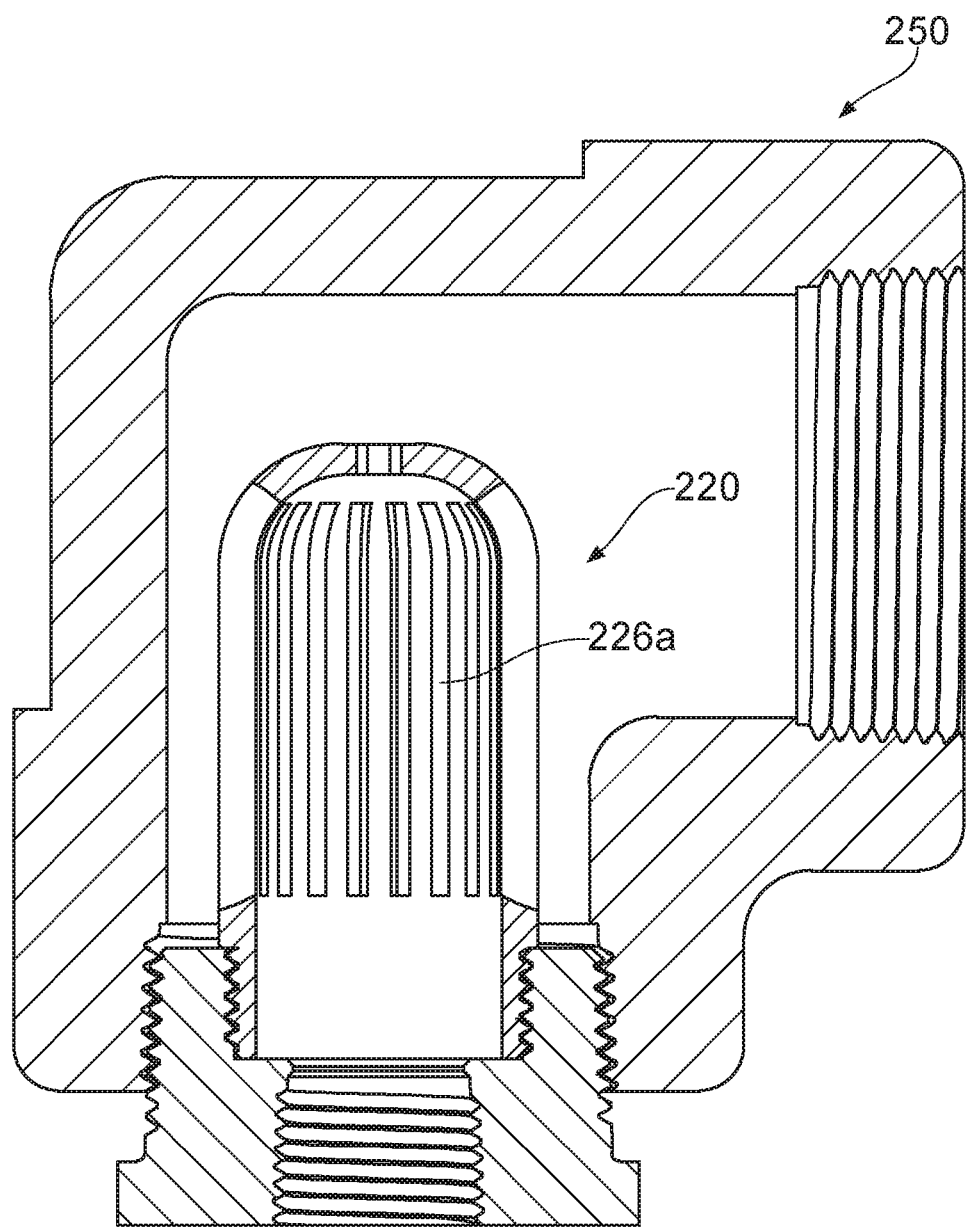
FIG. 4 is another sectional view of the reducing bush and filter, mounted to an elbow fitting in accordance with another embodiment of the present invention.

FIG. 4 shows a further embodiment which includes like parts with the FIG. 3 embodiment and these are not described again in detail. The reference numerals of the like parts share the same latter two digits in both embodiments, but differ in that they are prefixed with a '2' in this second embodiment.

The filter 220 differs to the FIG. 3 embodiment in that it has a longer longitudinal length and is provided in an elbow fitting 250. The longer longitudinal length of the filter 220 allows the first section of the filter 220 which contains the slots 226a to be shorter than the first section of the filter 120 in FIG. 3 containing the slots 126a. These differences between filter 120 and filter 220 can accommodate the flow in the different pipe fittings and the potential differences in debris found.

Figure 5B:
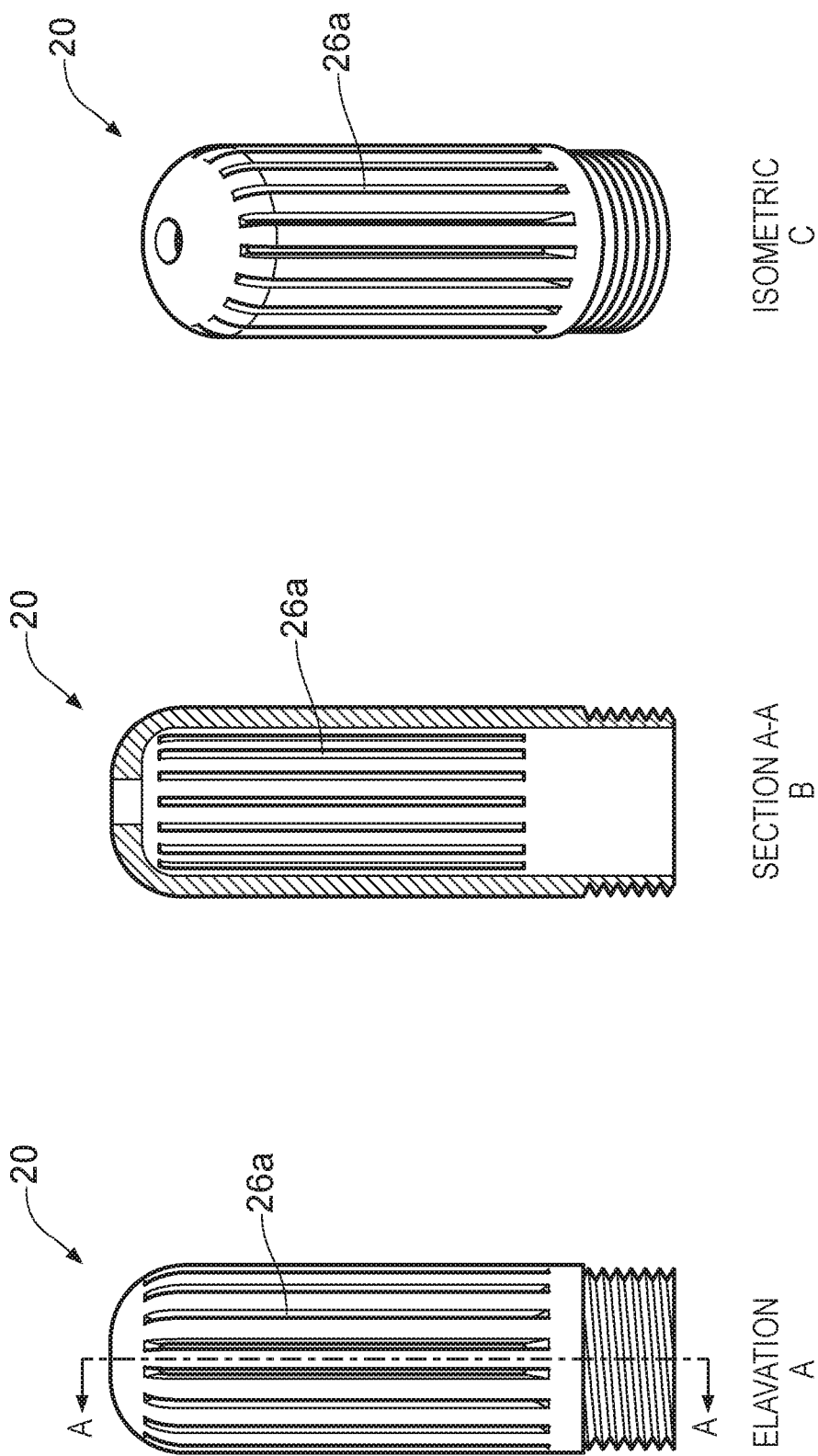
FIG. 5b shows three views of the FIG. 1f filter.

FIG. 5a shows a front view A, a sectional view B and a perspective view C of the filter 20 with circular holes 26b. Likewise, FIG. 5b shows a front view A, a sectional view B and a perspective view C of the filter 20 with slots 26a.

Figure 6A:
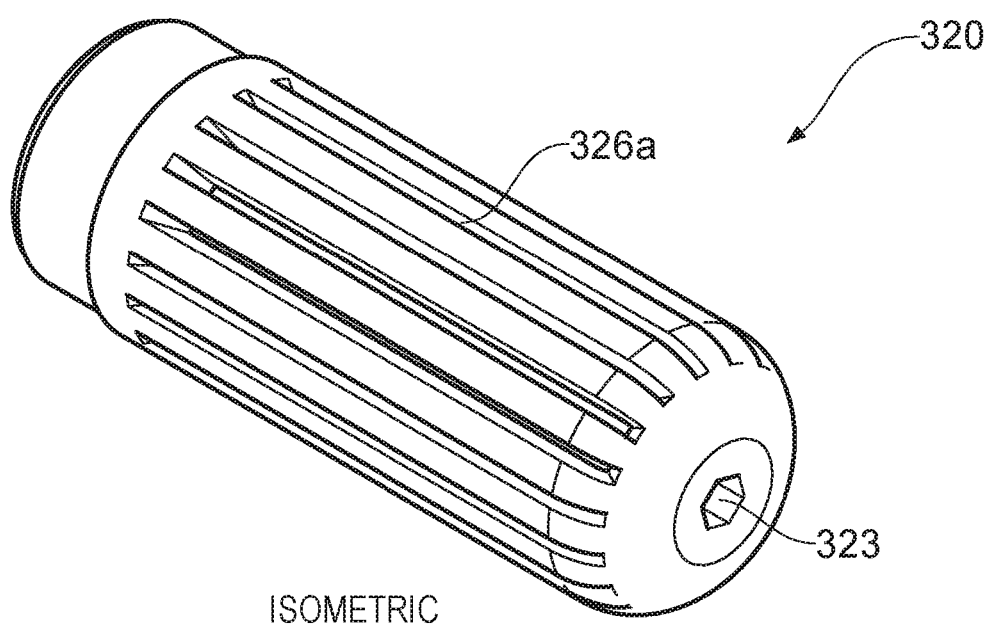
FIG. 6a is a perspective view of a filter with a hex-inlet in accordance with an embodiment of the present invention.
Figure 6B:
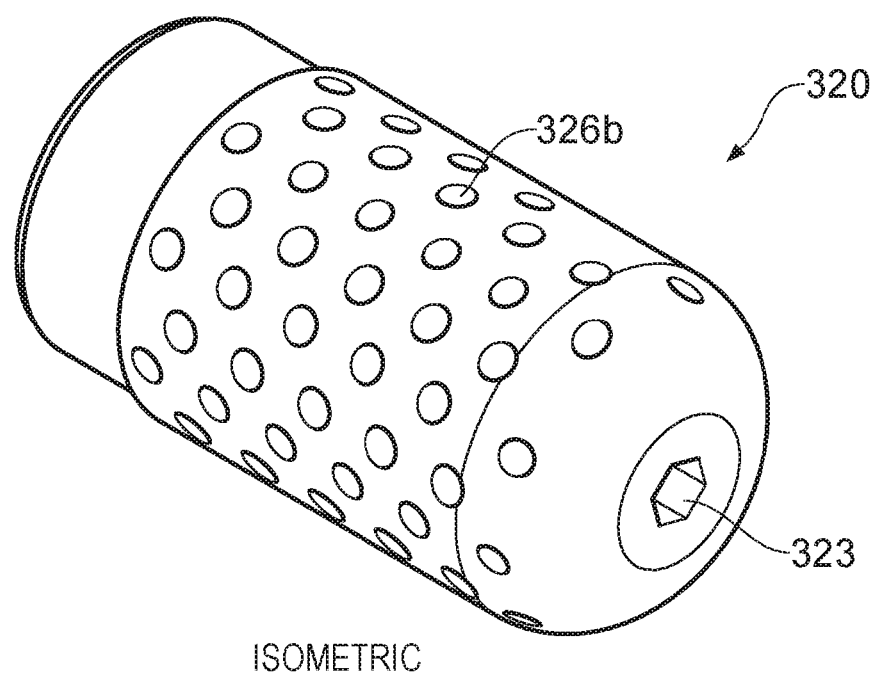
FIG. 6b is a perspective view of a filter with a hex-inlet in accordance with a further embodiment of the present invention.

FIGS. 6a & 6b show further embodiments of the filter 320 comprising slots 326a and circular holes 326b respectively. The filter 320 further comprises an inlet 323 which is hexagonal in shape. In use, the hex-inlet 323 allows the filter 320 to be mounted to a reducing bush (not shown in FIGS. 6a & 6b) using an Allen key.

Figure 7:
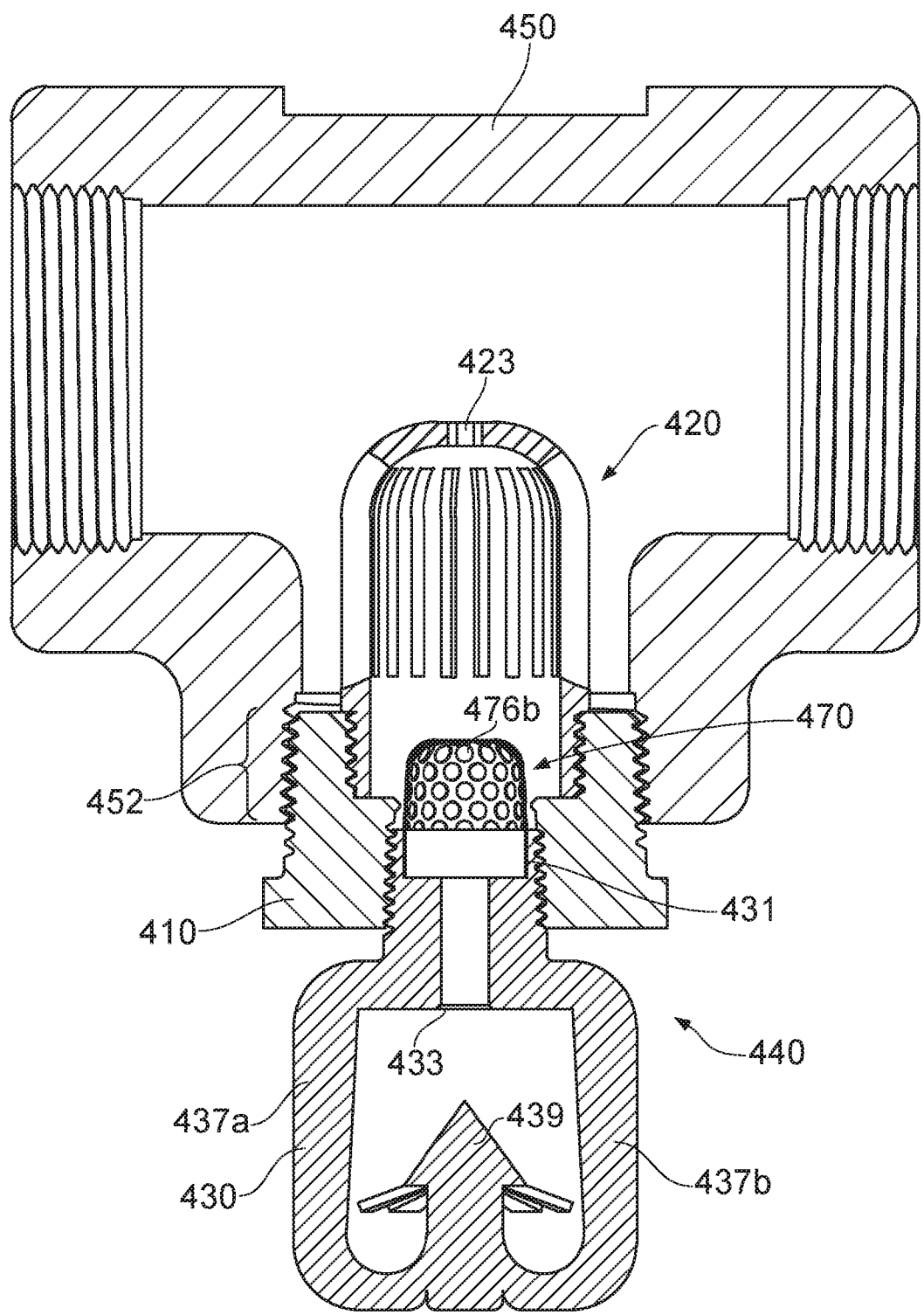
FIG. 7 is a sectional view of the nozzle apparatus showing a further filter attached to the nozzle in accordance with a further embodiment of the present invention; and, FIG. 8 is a sectional view of the nozzle apparatus showing an alternative embodiment of the further filter.

FIG. 7 shows a further embodiment of the present invention which includes similar features to the earlier embodiments. These features will not be described again in detail. FIG. 7 shows nozzle apparatus 440 comprising reducing bush 410, filter 420 and nozzle 430. The filter 420 and the nozzle 430 are both mounted to the reducing bush 410. The nozzle 430 comprises an outlet 433 in line with a deflector 439 attached by arms 437a & 437b. The nozzle apparatus 440 is mounted to a T-fitting 450 which comprises a threaded socket 452. In accordance with a further embodiment of the present invention, FIG. 7 shows the nozzle apparatus 440 comprising a further filter 470 mounted on the nozzle 430.

In use, the further filter 470 and the nozzle 430 are directly connected. This embodiment of the further filter 470 is formed with holes 476b, but slots are also an option (e.g. as will be seen from FIG. 8). The further filter 470 may be made to a standard shape and design, and engage with the nozzle 430 via nozzle bore 431. The further filter 470 is located centrally within reducing bush 410 such that it is in the flow path between the inlet 423 of the filter 420 and the nozzle outlet 433.

An advantage of embodiments comprising a further filter 470 is that the volume of debris entering the nozzle apparatus 440 is even further reduced.

Figure 8:
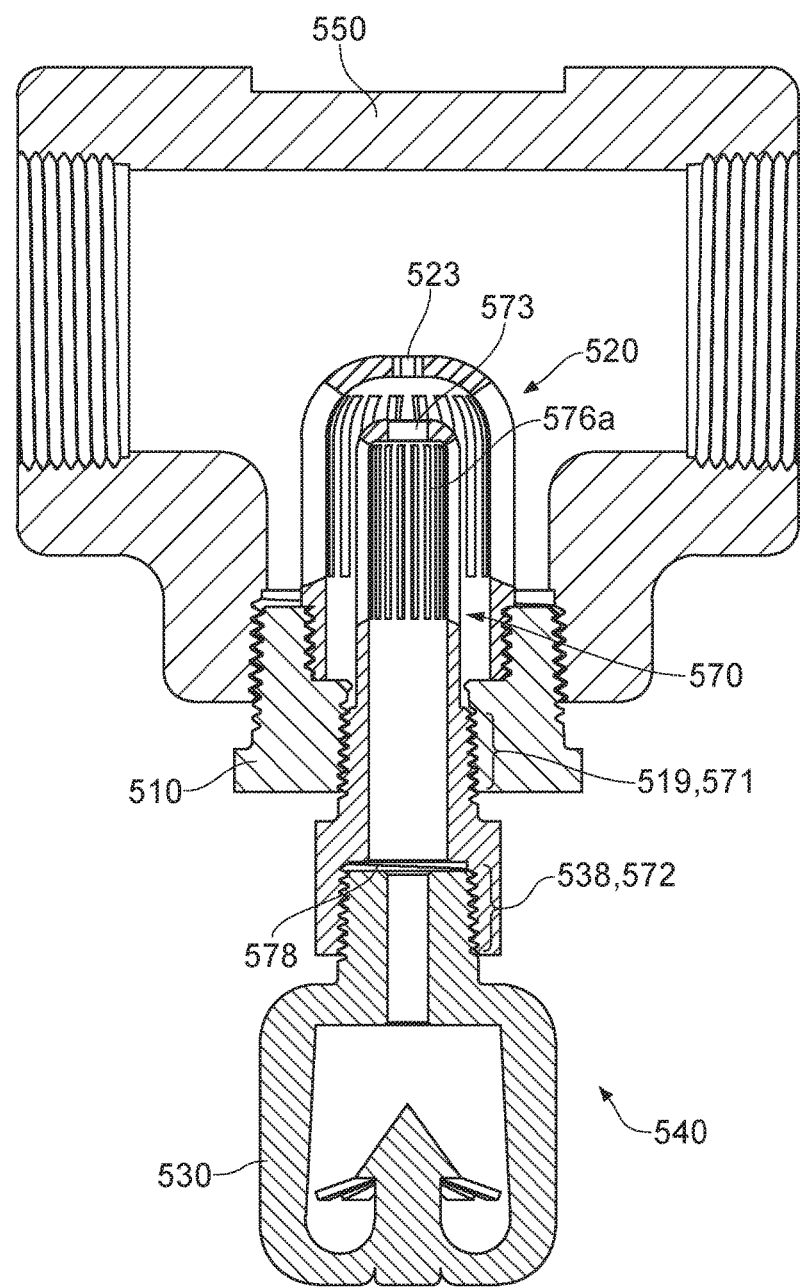

FIG. 8 shows a further embodiment of the present invention which includes like parts with the FIG. 7 embodiment and these are not described again in detail. The reference numerals of the like parts share the same latter two digits in both embodiments, but differ in that they are prefixed with a '5' in this particular embodiment rather than a '4'.

The further filter 570 is part of an adaptor which also comprises a threaded portion 572 for mounting a nozzle 530. The adaptor also comprises an upper threaded portion 571 that threadably engages the lower threaded portion 519 of the reducing bush 510. In this way the nozzle 530 is indirectly mounted on the reducing bush 510 by being mounted on the inside of further filter 570, with threaded outer portion 538 of the nozzle 530 threadably engaging the lower threaded portion 572 of the further filter 570.

The further filter 570 comprises slots 576a, with a greater longitudinal length than further filter 470 of FIG. 7, such that further filter 570 extends closer to the inlet 523 of filter 520. Further filter 570 also comprises an end inlet 573, the central axis of which is aligned with that of the inlet 523 of filter 520 and an outlet 578 which leads to the nozzle 530.

Modifications and improvements can be incorporated without departing from the scope of the invention.

The invention claimed is:

1. A pipeline apparatus comprising a reducing bush apparatus having a reducing bush, a filter, a nozzle, and a pipe fitting upstream of the reducing bush, the pipe fitting being one of a T-fitting, elbow fitting, angle fitting and straight pipe; and comprising a threaded socket, the reducing bush being a single piece and having:
   an outer surface, the outer surface comprising a threaded portion at a first end connected to the threaded socket of the pipe fitting;
   a bore extending from the first end to a second end;
   the bore having an inner surface;
   wherein the inner surface comprises a first threaded portion threadably engaged with the filter at its first end on an inside of the pipe fitting, and a second threaded portion, threadably engaged with the nozzle, at its second end on an outside of the pipe fitting;
   wherein the outer surface has a larger diameter than the second end of the inner surface;
   wherein the first threaded portion has a larger diameter than the second threaded portion; and
   wherein an internal cross-sectional area of the filter is at least one of the same as and larger than, a cross-sectional area of the bore of the reducing bush at the second end.

2. A pipeline apparatus as claimed in claim 1, the first threaded portion is opposite the threaded portion on the outer surface and the diameter of the outer surface is greater than the diameter of the first threaded portion.

3. A pipeline apparatus as claimed in claim 1, wherein the first threaded portion and the second threaded portion are discontinuous.

4. A pipeline apparatus as claimed in claim 1, wherein one of the inner threaded portions includes a parallel thread and the other of the inner threaded portions includes an NPT thread.

5. A pipeline apparatus as claimed in claim 1, wherein an inlet to the filter has a polygonal cross-sectional area.

6. A pipeline apparatus as claimed in claim 1, wherein the filter has a tube extending from a first end to a second end, an inlet at the first end, the tube having a filter bore with a first internal cross-sectional area and a plurality of further inlets in the filter between an outside thereof and the filter bore.

7. A pipeline apparatus as claimed in claim 6, wherein the further inlets comprise slots.

8. A pipeline apparatus as claimed in claim 1, further comprising a further filter attached to the nozzle, the further filter extending into the bore of the reducing bush.

9. A pipeline apparatus as claimed in claim 8, wherein the further filter extends through the bore of the reducing bush past its first end.

10. A method of distributing fluid in a sprinkler system for firefighting and/or fire containment, the method comprising:

providing a pipeline apparatus comprising a reducing bush apparatus having a reducing bush, a filter, a nozzle, and a pipe fitting upstream of the reducing bush, the pipe fitting being one of a T-fitting, elbow fitting, angle fitting and straight pipe; and comprising a threaded socket; the reducing bush being a single piece and having:
- an outer surface, the outer surface comprising a threaded portion at a first end connected to the threaded socket of the pipe fitting;
- a bore extending from the first end to a second end;
- the bore having an inner surface;
- wherein the inner surface comprises:
  - a first threaded portion threadably engaged with the filter at its first end on an inside of the pipe fitting, and a second threaded portion threadably engaged with the nozzle at its second end on an outside of the pipe fitting;
- wherein the outer surface has a larger diameter than the second end of the inner surface;
- wherein the first threaded portion has a larger diameter than the second threaded portion;
- wherein an internal cross-sectional area of the filter is at least one of the same as and larger than, a cross-sectional area of the bore of the reducing bush at the second end; and introducing fluid into the pipeline apparatus,
flowing fluid through the pipe fitting, filter and nozzle;
distributing the fluid for at least one of firefighting and fire containment.

11. A method as claimed in claim 10, wherein the sprinkler system is an open sprinkler system.

* * * * *